United States Patent [19]
Hiratsuna et al.

[11] Patent Number: 5,197,265
[45] Date of Patent: Mar. 30, 1993

[54] MULCHING TYPE POWER LAWN MOWER

[75] Inventors: Kenjiro Hiratsuna; Masatoshi Harumatsu; Kazuhiro Sakamoto, all of Saitama, Japan

[73] Assignee: Honda Giken Kogyo Kabushiki Kaisha, Tokyo, Japan

[21] Appl. No.: 813,747

[22] Filed: Dec. 30, 1991

[30] Foreign Application Priority Data

Apr. 1, 1991 [JP] Japan .................................. 3-20625

[51] Int. Cl.[5] ...................... A01D 34/63; A01D 67/00
[52] U.S. Cl. ..................... 56/12.9; 56/17.4; 56/17.5; 56/320.1
[58] Field of Search ............ 56/12.9, 16.7, 17.4, 56/17.5, 193, 255, 320.1, 320.2

[56] References Cited

U.S. PATENT DOCUMENTS

| 780,964 | 1/1905 | Moennighoff | 56/193 |
|---|---|---|---|
| 3,715,875 | 2/1973 | Brucker | 56/320.1 |
| 3,795,095 | 3/1974 | Erickson et al. | 56/320.2 |
| 3,805,498 | 4/1974 | Armstrong | 56/17.5 |

FOREIGN PATENT DOCUMENTS 1163635  9/1958  France ..................... 56/17.5

*Primary Examiner*—David J. Bagnell
*Attorney, Agent, or Firm*—Armstrong, Westerman, Hattori, McLeland & Naughton

[57] ABSTRACT

A power lawn mower of a mulching type with no opening for releasing mowed pieces sidewardly and having a housing with a short peripheral side wall with an inwardly protruding at a rear substantially half portion of a lower edge of the peripheral wall in the direction of forward movement of the lawn mower. The protruding portion temporarily retains mowed lawn pieces, or cuttings within the housing for chopping by a cutter rotatable in the housing. Chopped lawn pieces or cuttings are dropped through a lawn drop opening defined by the peripheral wall and deposited between blades of the cut lawn grass. The moved pieces are chopped to a moderate extent and dropped through the blades of the cut lawn grass to promote growth of the lawn grass.

10 Claims, 6 Drawing Sheets

MULCHING TYPE POWER LAWN MOWER

BACKGROUND OF THE INVENTION

1. Field of the Invention

This invention relates to power lawn mowers and more particularly, improvements of power lawn mowers comprising a housing having a short cylindrical peripheral wall defining a lawn drop opening and an upper wall connected to an upper edge of the peripheral wall, a plurality of travelling wheels supporting the housing, an engine mounted on the housing upper wall and having a driving shaft projecting into the housing, and a cutter mounted on the driving shaft and rotatably driven within the peripheral wall.

2. Description of the Prior Art

When mowed lawn grass or cuttings are dropped onto a lawn surface and the size of the cuttings is large, the patch of lawn covered with the cuttings is poor in transmission of light and in permeability of air, resulting in fear that the growth of such lawn grass so covered with the cuttings is damaged. Thereupon, it is necessary to chop the mowed lawn grass into short pieces so as to drop such short pieces between blades of the lawn grass.

There is a known power lawn mower (see U.S. Pat. No. 4,158,279) in which in order to meet the requirement for short pieces, an inwardly projecting portion is provided over the entire lower edge of the peripheral wall, so that mowed lawn pieces are retained in a region within a radius of rotation of the cutter within the housing.

If the inwardly projecting portion is provided over the entire lower edge of the peripheral wall of the housing, as described above, the mowed lawn pieces are retained in an excessive amount in the housing, thereby causing an increased load on the cutter, resulting in the cutter failing to sufficiently fulfill its intrinsic mowing function and in deteriorated durability of the engine.

There is also a further problem that the lawn grass cannot be effectively mowed because a front portion of the inwardly protruding portion, in a direction of forward movement of the lawn mower, acts to delay the time for the lawn grass pushed down by the peripheral wall to be restored to a standing state.

In addition, in the power lawn mower of such prior art type, the cutter is rotated from the front, toward the rear, in the direction of forward cutting movement of the lawn mower at one side of a vertical plane parallel to the direction of such forward cutting movement of the lawn mower and bisecting the housing, but is rotated from the rear toward the front on the other side of such vertical plane.

When the lawn grass is mowed by such power lawn mower, the cutting modes of the cutter on one on the other sides of such vertical plane are different from each other and, correspondingly, areas of the lawn surface cut on the one side are different in condition from areas cut on the other side. Therefore, there is a need for a means for providing a uniform condition of the lawn surface over such two mowed areas. Such means is not found in prior art power lawn mowers.

Hence, the lawn surface mowed with the prior art power lawn mower has a mottled pattern and an inferior external appearance.

Further, in a lawn mowing operation by the lawn mower of such prior art type, a patch of lawn grass falling down by the travelling wheels, particularly, by the front wheels, lacks firmness and hence, is liable to be pushed back, outwardly of the peripheral wall, by the left and right sides of the peripheral wall, with the result that lawn grass portions left uncut are apt to be generated along a treading path of each of the front wheels. Means for preventing such lawn grass uncut is not provided in the prior art power lawn mower.

In such circumstances, the lawn surface cannot be mowed uniformly by a single lawn mowing operation and, therefore, the lawn mowing operation must be carried out once more along the treading path of each front wheel, resulting in inferior workability.

SUMMARY OF THE INVENTION

Accordingly, it is an object of the present invention to provide a power lawn mower designed so that mowed lawn grass pieces can be chopped to a moderate extent by an extremely simple means, and the load acting on the cutter can be reduced.

To achieve the above object, according to the present invention, there is provided a power lawn mower comprising a housing having a short cylindrical peripheral wall defining a lawn drop opening and an upper end wall connected to an upper edge of the peripheral wall, a plurality of travelling wheels supporting the housing, an engine mounted on an upper surface of the upper end wall having a drive shaft projecting into the housing, and a cutter mounted in the housing on the drive shaft, wherein the housing includes, in a rear substantial half portion of a lower edge of the peripheral wall, in the direction of forward movement of the lawn mower, an inwardly protruding portion for temporarily storing mown lawn pieces or grass cuttings in a region within a radius of rotation of the cutter.

With the above construction, it is possible to chop the mown lawn pieces or grass cuttings to a moderate extent and to drop the chopped pieces between blades of the lawn grass, thereby assisting the growth of the lawn grass.

In addition, because the protruding portion is not located in a front substantial half of the lower edge of the peripheral wall in the direction of forward movement of the lawn mower, the lawn grass which is declined or pushed down by the peripheral wall can be restored early within the housing, so that the lawn grass can be mown efficiently.

The chopped lawn grass pieces are floated within the housing and sequentially dropped primarily from an area free of the protruding portion. Therefore, the amount of lawn grass pieces resident within the housing is properly adjusted. This enables the load produced with the chopping and acting on the cutter to be reduced, thereby permitting the cutter to fulfill its intrinsic lawn mowing function sufficiently and enhancing the durability of the engine.

It is another object of the present invention to provide a power lawn mower designed so that the lawn surface can be mowed uniformly over the whole lawn.

To achieve the above object, according to the present invention, there is provided a power lawn mower of the type described above, wherein the upper end wall of the housing has an air feed opening through which engine cooling air is blown against lawn grass located in a specific area. The specific area is a region which is located at one side of a vertical plane parallel to the direction of forward movement of the lawn mower and bisecting the housing and in which the cutter is rotated from the front toward the rear in the direction of forward movement of the lawn mower.

With the above construction, the fallen-down lawn grass is cut by the cutter in such a manner that it is stroked, on the one side, thereby providing substantially the same cutting mode of the cutter on the opposite sides of the vertical plane, insuring that the lawn surface can be mowed substantially uniformly over the whole area and leading to an improved external appearance of the mowed lawn surface.

In addition, in the lawn mowing operation, the engine cooling air is utilized. A special air feed source is not required and complications in a structure of the lawn mower is avoided.

It is a further object of the present invention to provide a power lawn mower having a good workability, wherein the lawn grass fallen down by each of the front wheels can be guided into the housing and mown therein.

To achieve the above object, according to the present invention, there is provided a power lawn mower of the type described above, wherein the power lawn mower further includes lawn intake chambers disposed between the left and right opposite sides of the peripheral wall and the front wheels opposed to the opposite sides, respectively, so that an air drawing action produced with the rotation of the cutter is applied to each of the lawn intake chambers to guide the lawn grass fallen down by the front wheels into the housing.

With the above construction, the air drawing action produced with the rotation of the cutter can be applied to each of the lawn intake chamber to guide the lawn grass fallen down by each front wheel in such a manner that it is raised, thereby preventing the lawn grass from being left uncut along a treading path of the front wheel and leads to an improved lawn mowing.

The above and other objects, features and advantages of the invention will become apparent from a consideration of the following detailed description of the preferred embodiments, taken in conjunction with the accompanying drawings.

DESCRIPTION OF THE PREFERRED EMBODIMENTS

Figure 1:
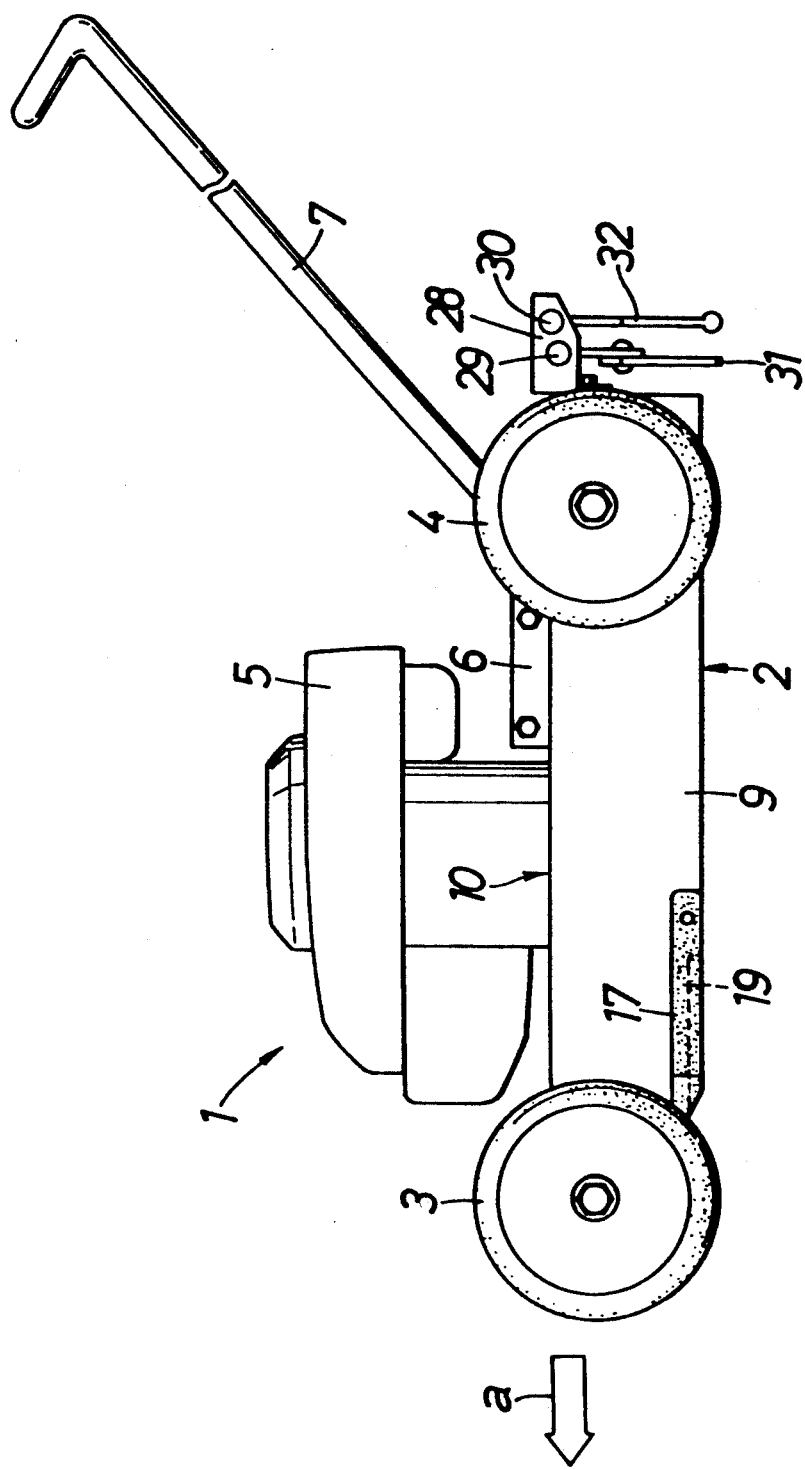
FIG. 1 is a side view of the power lawn mower of one embodiment of the present invention.

Referring to FIGS. 1 to 4, a mulching type power lawn mower 1 comprises a steel housing 2, a pair of left and right front wheels 3 and a pair of left and right rear wheels 4 as a plurality of travelling wheels disposed on front and rear sides of the housing 2 for travel in a direction a of forward movement of the lawn mower 1. An engine 5 is mounted on the housing 2 for driving the rear wheels 4. A handle 7 is mounted at its opposite base ends to a pair of mounting plates 6, 6 on the upper surface of the housing 2 behind the engine 5.

Figure 2:
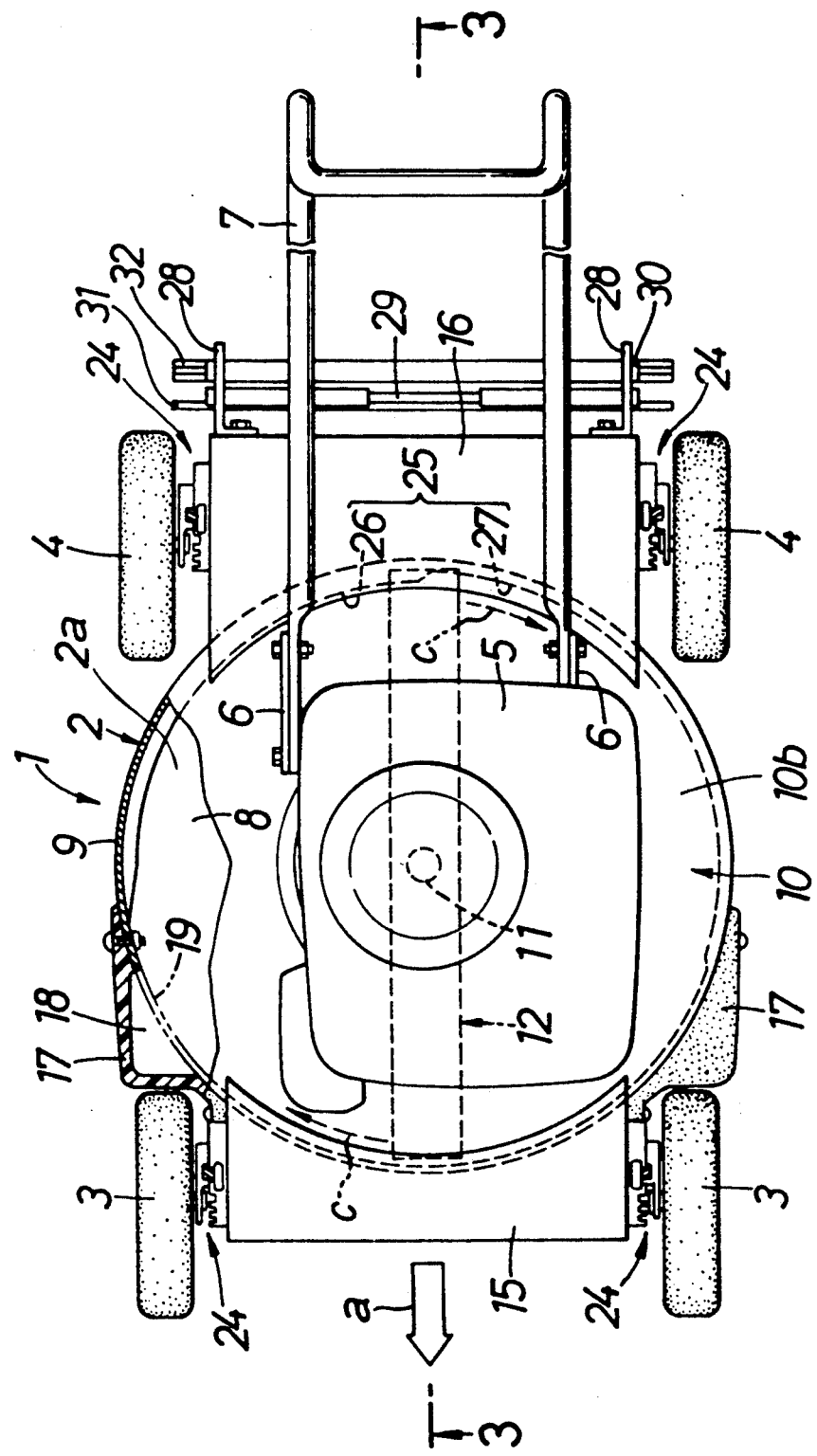
FIG. 2 is a partly broken plan view of an essential portion of the power lawn mower of FIG. 1.
Figure 3:
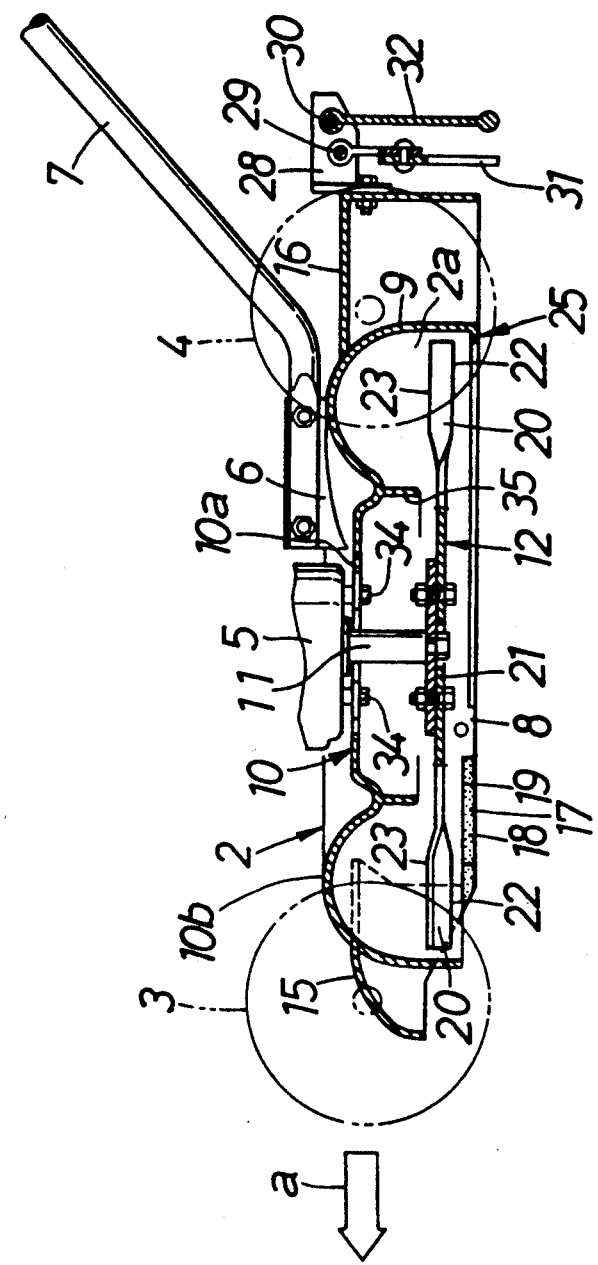
FIG. 3 is a sectional view taken along a line 3—3 in FIG. 2.

As best shown in FIG. 3, the housing 2 has a short cylindrical peripheral wall 9 defining a lawn cutting drop opening 8, and an upper end wall 10 connected to an upper edge of the peripheral wall 9. The engine 5 is mounted on an upper surface of central portion 10a of the upper end wall 10 and has a driving shaft 11 projecting through upper wall 10 into the housing 2. A plate-like cutter 12 is mounted substantially horizontally at the lower end of the driving shaft 11 and driven for rotation in a clockwise direction, as viewed in FIGS. 2 and 4, inside the peripheral wall 9 by engine 5.

Figure 4:
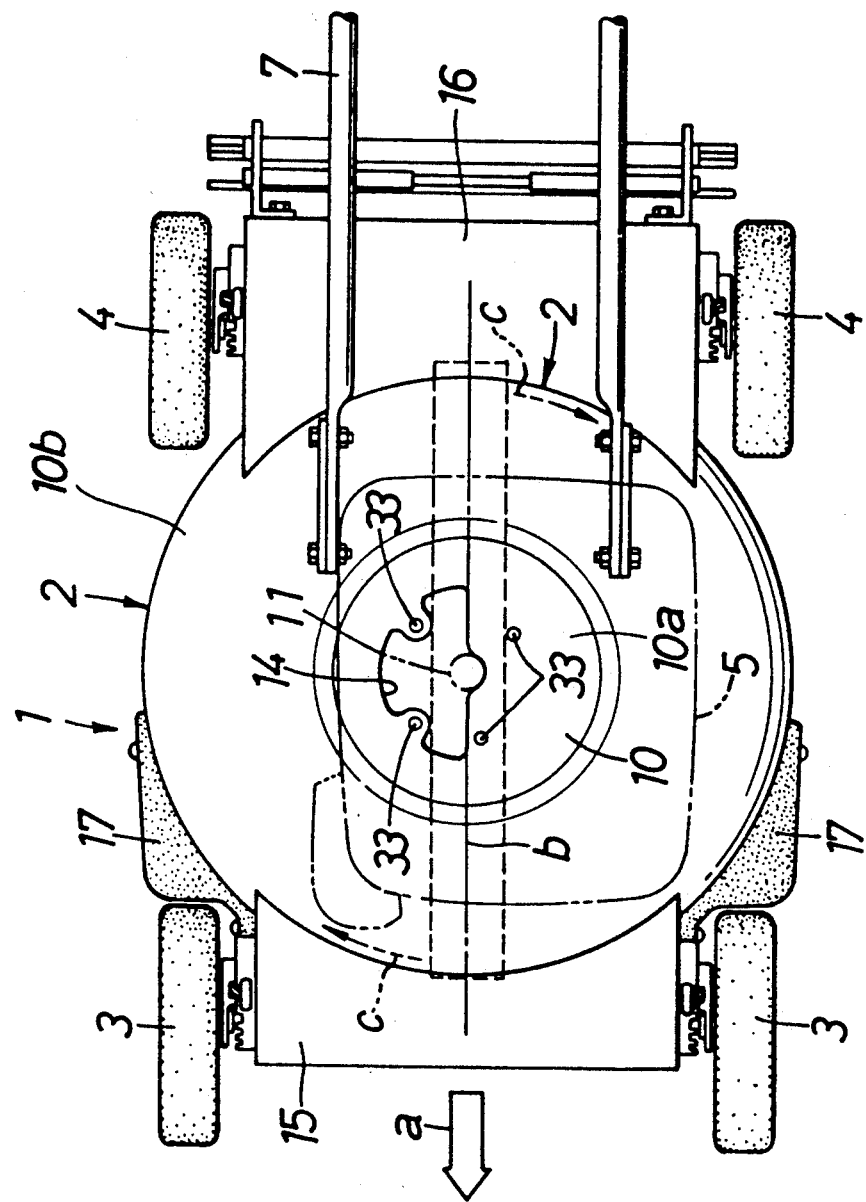
FIG. 4 is a plan view of the power lawn mower with the engine removed therefrom.
Figure 5:
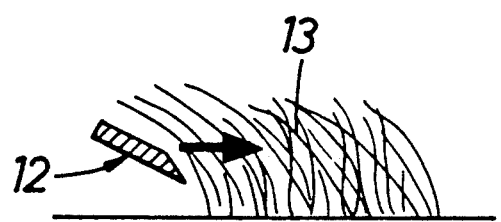
FIG. 5 is a diagram illustrating one lawn cutting mode.
Figure 6:
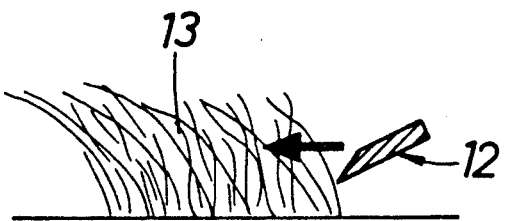
FIG. 6 is a diagram illustrating another lawn cutting mode.
Figure 7:
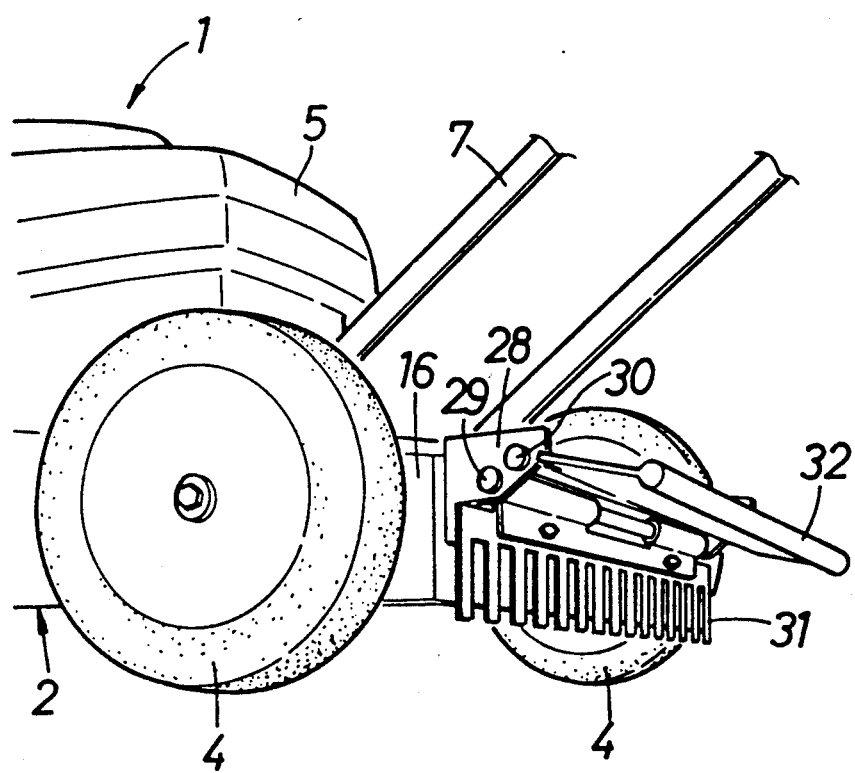
FIG. 7 is a partial perspective view of the rear portion of the power lawn mower of FIG. 1.

If the cutter 12 is disposed in this manner, the cutter 12 is rotated clockwise from the front to the rear in the direction of forward movement a of the lawn mower on the right side of vertical plane b, FIG. 4, parallel to the direction a of forward movement of the lawn mower and bisecting the housing 2, e.g., on the right side of vertical plane b in the direction a of forward movement of the lawn mower in the illustrated embodiment. Thus, on the right side of the mower, the patch of lawn grass 13 tends to be pushed down by the peripheral wall 9 with the forward movement of the power lawn mower 1 and is cut by the cutter 12 in such a manner that such lawn grass is raised, as shown in FIG. 5. In addition, on the other side of the vertical plane b, i.e., on the left side, the cutter 12 is rotated from the rear to the front in the direction a of forward movement of the lawn mower. Thus, on the left side, a patch of lawn grass 13 which is pushed down by the peripheral wall 9 is cut by the cutter 12 in such a manner that such lawn grass is stroked downward, as shown in FIG. 6.

As a result of such action of peripheral wall 9 on the lawn grass at the opposite sides of mower 1 as such mower is moved forward in the direction of arrow a, the lawn cutting modes of the cutter 12 are different from each other on the right and left sides of the vertical plane b. In order to overcome such different cutting modes in this embodiment of the present invention, an air feed opening 14 is provided in the upper end wall 10 of housing 2 on the right side of the vertical plane b. Engine cooling air is introduced through air feed opening 14 into housing 2 and blows against the patch of lawn grass 13 on the right side of vertical plane b and tending to be pushed down by peripheral wall 9. Such air, striking the uncut lawn grass tends to hold the pushed down grass in such declined state and provides substantially the same lawn cutting lawn grass mode as of the other side of the vertical plane b.

As best shown in FIG. 2, wheel supporting members 15 and 16 are projectingly mounted at the front and rear portions, respectively, of the peripheral wall 9. The front and rear wheels 3 and 4 are supported by pins on opposite sides of the wheel supporting members 15 and 16. As a result, the front wheels 3 are disposed immediately in front of the peripheral wall 9 on the left and right sides, respectively, in the direction of forward movement of the lawn mower.

Vessels 17 are mounted on an outer surface of the peripheral wall 9 on the left and right sides thereof, respectively, in proximity to the front wheels 3. Each of the vessels 17 defines a lawn intake chamber 18 which is opened downwardly to face to the patch of lawn grass bent down by the front wheels 3. Chambers 18 are each opened into the housing 2 via a notch 19 in the peripheral wall 9 (FIGS. 2 and 3).

As shown in FIG. 3, each of opposite blades 20 of the cutter 12 has a twisted configuration relative to mounting portion 21 therefor, with a cutting edge 22 located at a lower side, and a raised edge 23 located at an upper side.

As cutter 12 is rotated, air flow from the edge 22 toward the ridge 23 is developed at the ends of blade 20, thereby permitting a drawing effect to be provided in each of the lawn intake chamber 18, so that the lawn grass bent down by the front wheels 3 is raised and enters housing 2.

Each of the front and rear wheels 3 and 4 is designed to be raised and lowered relative to the housing 2 by conventional adjusting mechanism 24, so that the spacing between the cutter 12 and the lawn surface can be adjusted.

In housing 2, FIGS. 2 and 3, an inwardly protruding portion 25 is formed at a rear substantial half portion of the lower edge of peripheral wall 9 at the rear of the mower in the direction a of forward movement of the lawn mower. The protruding portion 25 functions to allow a temporary retention of the mowed lawn pieces or cuttings in a region within a radius of rotation of the cutter 12. The right hand section 26 of protruding portion 25 is wider than left hand section 27, as best shown in FIG. 2.

The upper end wall 10, FIG. 3, has an outer peripheral portion 10b which is formed arcuately, in section, extending upwardly from central portion 10a, so that an outer peripheral area 2a within the housing has an increased volume. A cylindrical partition wall 35 is projectingly provided and extends downwardly on a lower surface of upper end wall 10 at the connection between the central portion 10a and the outer peripheral portion 10b to define the inner boundary of outer peripheral area 2a. By defining the outer peripheral area 2a in this manner, the mowed lawn pieces or cuttings can be floated sufficiently within the outer peripheral region 2a.

As clearly shown in FIGS. 1 to 3 and 7, a pair of left and right brackets 28 are projectingly mounted at a rear portion of housing 2 in the direction a of forward movement of the lawn mower, e.g., at a rear surface of the rear wheel supporting member 16 in the illustrated embodiment, and a pair of front and rear support rods 29 and 30 are spanned in parallel to each other between brackets 28. A rake 31 is rotatably hung on the front support rod 29 for providing a raking action to the lawn surface, while a guide plate 32 is rotatably hung on the rear support rod 30 for preventing foreign matters from flying from the rear into the housing 2.

In FIG. 4, reference numeral 33 is an insertion hole for an engine mounting bolt 34 (FIG. 3).

In a lawn mowing operation, the engine 5 is operated to rotate the cutter 12 in the clockwise direction as viewed in FIG. 2 and to drive the opposite rear wheels 4, thereby moving the power lawn mower 1 forwardly.

Lawn grass is mowed by the rotation of the cutter 12, and mowed lawn pieces or cuttings are lifted up above the outer peripheral area 2a with the housing 2 by the aid of the twisting opposite ends 20 of the blade 12. Such lifting action permits the mowed lawn pieces or cuttings to be temporarily retained above the inwardly protruding portion 25 while being floated within the outer peripheral portion 2a. The retained lawn pieces or cuttings are located in the region within the radius of rotation of the cutter 12 and, hence, are chopped to a moderate extent under a cutting action by the cutter 12.

The chopped lawn pieces are floated or suspended within the outer peripheral area 2a and then sequentially dropped through the lawn drop opening 8 onto the lawn surface. Some of the chopped lawn pieces or cuttings are dropped between ones of blades of lawn grass, while some are left on the lawn surface.

As the rake 31 contacts the mowed lawn surface with the forward movement of the power lawn mower 1, a raking action is provided to the lawn surface and, therefore, the mowed lawn pieces or cuttings laying on the lawn surface are dropped between blades of the lawn grass.

The thus-dropped lawn pieces or cuttings rot and fertilize the lawn. Damage to lawn growth by the mowed lawn pieces or cuttings is avoided.

The dropping of the chopped lawn pieces is conducted primarily from a portion free from the protruding portion 25 in the lawn drop opening 8, but also from the wider section 26 and the narrower section 27 of the protruding portion 25. The amount of lawn pieces temporarily retained within the housing 2 is adjusted properly in this manner, thereby reducing the load produced with the chopping and acting on the cutter 12. In this case, if the protruding portion 25 is provided over the entire periphery of the lower edge of the peripheral wall 9, mowed lawn pieces or cuttings are retained in an excessive amount in the housing 2 and hence, the load acting on the cutter 12 is increased.

The lawn grass bent down by each of the front wheels 3 is introduced into the housing 2 in a raised manner by air drawing action provided to the lawn intake chamber 18 with the rotation of the cutter 12, as it is cutting. This prevents leaving of uncut lawn grass along a treading path of each of the wheels 3.

Further, because the engine cooling air is blown through the air feed opening 14, against the bent lawn grass on the right side of the vertical plane b, such lawn grass is sufficiently pushed down. This ensures that a patch of lawn grass is cut in a stroked manner on both the left and rights sides of the vertical plane b so that the lawn surface is mowed substantially uniformly over the whole lawn area.

What is claimed is:

1. A power lawn mower of a mulching type with no opening for releasing mowed pieces sidewardly comprising:

a housing having a short cylindrical peripheral wall defining a lawn drop opening at a lower edge thereof and an upper end wall connected to an upper edge of said peripheral wall and forming a closure at the top of said housing, a plurality of travelling wheels supporting said housing, an engine mounted on an upper surface of said upper end wall and having a drive shaft projecting through said upper end wall into said housing, and a cutter mounted on said drive shaft and rotatably driven in said housing within said peripheral wall, said housing including in a rear substantial half portion at the lower edge of said peripheral wall in a direction of forward movement of said lawn mower, an inwardly protruding portion which projects into the housing substantially parallel to a rotary plane of the cutter for temporarily retaining mowed pieces of lawn within said housing in a region within a radius of rotation of said cutter.

2. A power lawn mower according to claim 1, wherein said upper end wall of said housing has an air feed opening through which engine cooling air is drawn and blown by said rotating cutter against lawn grass located in a region at one side of a vertical plane parallel to the direction of forward movement of the lawn mower and bisecting said housing and in which said cutter is rotated in a direction from the front toward the rear relative to forward movement of said lawn mower.

3. A power lawn mower according to claim 1 or 2, further including a rake for providing a raking action to said lawn surface after cutting by said lawn mower to cause mowed lawn pieces on the cut lawn surface to drop between blades of cut lawn grass, and a guide plate for preventing foreign matters from flying into said housing, said rake and said guide plate being disposed at a rear portion of said housing in the direction of forward movement of said lawn mower.

4. A power lawn mower according to claim 3, wherein an outer peripheral portion of said upper end wall of said housing is formed arcuately in section so as to protrude upwardly from a central portion of said upper end wall.

5. A power lawn mower according to claim 1 or 2, wherein front wheels of said travelling wheels are disposed immediately in front and at left and right opposite sides of said peripheral wall in the direction of forward movement of said lawn mower, and said power lawn mower further includes lawn intake chambers disposed between the left and right opposite sides of said peripheral wall and said front wheels opposed to said opposite sides, respectively, so that said cutter rotating within said peripheral wall draws air into the lawn intake chambers to guide lawn grass bent down by said front wheels into said housing.

6. A power lawn mower according to claim 5, further including a rake for providing a rake action to said lawn surface mowed lawn pieces on the lawn surface to drop between blades of the cut lawn grass, and a guide plate for preventing foreign matters from flying into said housing, said rake and said guide plate being disposed at a rear portion of said housing in the direction of forward movement of said lawn mower.

7. A power lawn mower according to claim 6, wherein said outer peripheral portion of said upper end wall of said housing is formed arcuately in section projecting upwardly than a central portion of said upper end wall.

8. A power lawn mower of a mulching type with no opening for releasing mowed lawn pieces sidewardly comprising:
a housing having a short cylindrical peripheral wall defining a lawn drop opening at a lower edge thereof, and
a cutter rotatably driven within said peripheral wall, wherein
said peripheral wall is provided, at a rear substantial half portion of the lower edge thereof, in a direction of forward movement of said lawn mower, with an inwardly protruding portion which projects into the housing substantially parallel to a rotary plane of the cutter for temporarily retaining mowed lawn pieces in a region within a radius of rotation of said cutter.

9. A power lawn mower comprising
a housing having a short cylindrical peripheral wall defining a lawn drop opening and an upper end wall connected to an upper edge of said peripheral wall,
a travelling wheel supporting said housing,
an engine mounted on an upper surface of said upper end wall and having a drive shaft projecting through said end wall into said housing, and
a cutter mounted to said drive shaft and rotatably driven within said housing, wherein said cutter is rotated from the front toward the rear, in a direction of forward movement of said lawn mower, at one side of a vertical plane parallel to said direction of forward movement of said lawn mower, said plane bisecting said housing, and said cutter rotating from the rear toward the front in the direction of forward movement of the lawn mower at the other side of said vertical plane, and wherein said upper end wall is provided with an air feed opening through which engine cooling air is drawn and blown against lawn located below said lawn mower and at said one side of said vertical plane.

10. A power lawn mower comprising
a housing having a peripheral wall defining a lawn drop opening,
a cutter rotatably driven within said peripheral wall, and
a plurality of front wheels disposed immediately in front of left and right opposite sides of said peripheral wall at the front of said housing in a direction of forward movement of said lawn mower, wherein
said power lawn mower further includes lawn intake chambers disposed between left and right opposite sides of said peripheral wall and said front wheels opposed to said opposite sides, respectively, so that an air drawing action produced by the rotation of said cutter is applied to each of said lawn intake chambers to guide lawn grass bent by said front wheels into said housing.

* * * * *